United States Patent Office 3,848,053
Patented Nov. 12, 1974

3,848,053
ALKYL ALUMINUM DISPOSAL METHOD
Luke J. Governale, Baton Rouge, La., assignor to
Ethyl Corporation, Richmond, Va.
No Drawing. Filed July 26, 1973, Ser. No. 382,726
Int. Cl. C01f 1/100, 7/04, 7/16
U.S. Cl. 423—115
17 Claims

ABSTRACT OF THE DISCLOSURE

Aluminum values are recovered from compositions containing aluminum alkyls by reaction with aniline to form aluminum anilides which are hydrolyzed with aqueous base (e.g., NaOH) to form aluminates which are precipitated by addition of alkaline earth metal base (e.g., lime). Both aniline and aqueous base are recoverable for recycle.

BACKGROUND

Aluminum alkyls are used as catalyst components in olefin polymerization systems. They are generally used with metal salts such as titanium chloride, vanadium chloride, vanadium oxychloride, and the like. Trialkyl aluminums are manufactured by reaction of alpha-olefins and hydrogen with aluminum metal according to well-known Ziegler technology. Alkyl aluminum sesquihalides are manufactured by reaction of alkylhalides with aluminum metal. After distilling the aluminum alkyl product from these reaction mixtures a residue remains which contains various aluminum alkyls. Disposal of this residue is difficult. Burning of the residue releases fine air-borne alumina ash which is objectionable. Direct treatment with caustic, water or alcohols can be hazardous due to the chemical nature of aluminum alkyls. Thus, a need exists for an economic, efficient, safe method of recovering aluminum from compositions containing aluminum alkyls.

SUMMARY

According to the present invention, aluminum is recovered from compositions containing aluminum alkyls by reaction with an aniline to form aluminum anilides, followed by hydrolysis of the aluminum anilides with aqueous base, followed by precipitation of the aluminum by treatment with alkaline earth metal bases. Both aniline and aqueous base are recoverable for recycle.

DESCRIPTION OF THE PREFERRED EMBODIMENTS

A preferred embodiment of this invention is a method of recovering aluminum from a composition containing an alkyl aluminum compound, said method comprising reacting said composition with an aniline to form an aluminum anilide, hydrolyzing said aluminum anilide with aqueous base, and reacting the hydrolyzed product with an alkaline earth metal base to precipitate an alkaline earth metal aluminate in a recoverable form.

Preferred aluminum anilide forming compounds are aniline and alkyl anilines such as ortho, meta or para toluidines, 2,4-dimethyl aniline, 2,4,6-trimethyl aniline, 4-ethyl aniline, 2,4-dilauryl aniline, and the like.

The amount of aniline should be an amount sufficient to convert most of the alkyl aluminum content of the composition to an anilide. The term "aluminum anilide" includes aluminum trianilides, dianilino aluminum halides, dianilino aluminum hydroxides, dihalo aluminum anilides, dihydroxy aluminum anilides, dianilino aluminum alkoxides, and the like. Generally, about 3 to 30 moles of an aniline are added per mole of alkyl aluminum compound in the composition, and more preferably about 5 to 15 moles of aniline per mole of alkyl aluminum compound.

The reaction of aniline with the alkyl aluminum containing composition is preferably conducted at a temperature of 100–500° C. A preferred temperature range is 200–300° C.

Hydrolysis is conducted by adding an aqueous base to the composition containing the aluminum anilide or by adding the composition containing the aluminum anilide to an aqueous base. The aqueous base is preferably an aqueous alkali metal hydroxide such as sodium hydroxide or potassium hydroxide. Sodium hydroxide is preferred.

The aqueous base is preferably a fairly concentrated aqueous solution of an alkali metal base containing about 5–40 weight percent alkali metal hydroxide. A preferred range is about 10–30 weight percent alkali metal hydroxide.

The amount of aqueous base should be sufficient to react with the aluminum anilide present to form aluminates and free the aniline for recovery. In general, about 2 to 6 moles of alkali metal hydroxide are used per mole of original alkyl aluminum compound in the composition, and more preferably about 3 to 5 moles of base per mole of alkyl aluminum compound. The hydrolysis can be conducted over a broad temperature range. Good results are obtained at 20–200° C. A preferred temperature range is 50–100° C.

Following addition of the aqueous base the aniline is removed. This is readily accomplished because the aniline is insoluble in the aqueous base and separates. In most systems anilines will float to the surface and can be decanted, or the aqueous base containing the alkali metal aluminate can be drained from the aniline through a valve located in the bottom of the storage vessel. The aniline can be dried over a drying agent such as anhydrous calcium sulfate or distilled and then recycled to the aniline reaction stage of a subsequent run to react with the aluminum alkyl compound to form more aluminum anilide.

The aqueous base solution containing aluminate (e.g., sodium aluminate) is then treated with an alkaline earth metal base which reacts with the aluminate anion to form an insoluble alkaline earth metal aluminate. Suitable bases include magnesium oxide, magnesium hydroxide, calcium oxide, calcium hydroxide, strontium oxide, strontium hydroxide, barium oxide, barium hydroxide, and the like. The most preferred alkaline earth metal base is lime (e.g., calcium oxide or calcium hydroxide) which is used as an aqueous slurry.

The alkaline earth metal base is preferably added as an aqueous solution or slurry. In general, the solution or slurry contains about 10–40 weight percent alkaline earth metal base. A very useful precipitating agent is a 10–30 weight percent aqueous slurry of hydrated lime.

The amount of alkaline earth metal base should be sufficient to convert the aluminate anion present to insoluble alkaline earth metal aluminates. A useful range is from about 1.0 to 1.5 moles of alkaline earth metal base per mole of aluminate anion.

The alkaline earth metal base precipitation step can be conducted over a broad temperature range. Good results are obtained at 20–200° C. A preferred temperature range is 50–100° C. At temperatures below about 50° C. the precipitate is gelatinous and difficult to work with.

After treatment with the alkaline earth metal base, the resultant aqueous slurry can be allowed to settle and the supernatant liquid drained off, concentrated by distillation, and recycled to the aluminum anilide hydrolysis stage since it contains the alkali metal hydroxide added at that stage.

The alkaline earth metal aluminate sediment can be used as a source of aluminum. In such use it is dried and subjected to a conventional aluminum recovery process.

The composition containing an aluminum alkyl compound from which the aluminum values are recovered can be any composition containing such alkyl aluminums.

For example, it can be the alkyl aluminum itself in fairly pure form, such as trimethyl aluminum, triethyl aluminum, tri-$n$-propyl aluminum, triisobutyl aluminum, tri-$n$-butyl aluminum, methyl aluminum sesquichloride, ethyl aluminum sesquichloride, ethyl aluminum dichloride, diethyl aluminum chloride, diethyl aluminum hydride, and the like. In this case, the present process provides a means of disposing of a highly reactive compound in a relatively safe, non-polluting manner. In a highly preferred embodiment the aluminum alkyl containing composition is the distillation residue remaining after manufacture of an alkyl aluminum compound according to known commercial methods. This residue presents a difficult disposal problem because it still contains reactive aluminum alkyls which react violently with water or alcohol, and if burnt, results in emission of airborne alumina powder.

In one embodiment, the aluminum alkyl containing composition is the distillation residue remaining after distilling an alkyl aluminum product from a reaction mixture formed by reacting a lower alpha-olefin (e.g., a $C_{2-5}$ alpha-olefin) and hydrogen with aluminum metal according to well-known Ziegler aluminum alkyl synthesis technology. The reaction is conducted in the presence of aluminum alkyls which initially forms alkyl aluminum hydride which adds olefin (H. Zeiss, "Organometallic Chemistry," A.C.S. Monograph Series, pp. 194–196, Reinhold Publishing Corp., New York, 1960, and references cited therein, incorporated herein by reference). Various ramifications of the Ziegler aluminum alkyl process are described in U.S. 2,787,626; 2,826,598; 2,885,314; 2,886,581; 3,050,540; 3,100,786; 3,207,770; 3,207,772; 3,207,773 and 3,207,774, which are incorporated herein by reference.

Olefins which are used to prepare the alkyl aluminum according to the Ziegler process are the alpha or terminal olefins such as ethylene, propylene, $n$-butene, isobutene, $\alpha$-pentene, 2-methyl-1-butene, and the like. Generally the olefin is a $C_{2-5}$ alpha-olefin.

The alkyl aluminum process is carried out under hydrogen pressure. Finely-divided aluminum metal is wetted with trialkyl aluminum under an inert atmosphere and the mixture pressurized with hydrogen followed by alpha-olefin or a mixture of hydrogen and alpha-olefin to about 10–300 atmospheres. The mixture is reacted at about 25–150° C., preferably 30–130° C., for a period sufficient to form a substantial quantity of alkyl aluminum product.

Alkyl aluminum product is recovered from the reaction mixture by distillation. The distillation is conducted until the product being distilled begins to contain an unacceptable amount of impurity. This leaves a distillation residue that contains aluminum metal and a crude mixture of organoaluminum compounds. Frequently this reaction or "heel" is used as the activator for subsequent alkyl aluminum preparations carried out by adding fresh aluminum metal to the heel and then again pressurizing with hydrogen and alpha-olefin as before. As this procedure is followed, the amount of distillation residue continues to increase and eventually at least a portion of it must be removed. This residue portion has in the past presented a difficult disposal problem.

In the above embodiment a preferred alkyl aluminum containing composition is a distillation residue resulting from the distillation of triethyl aluminum from a reaction mixture resulting from the reaction of ethylene and hydrogen with aluminum metal under Ziegler aluminum alkyl synthesis conditions. Another prefered application is to a distillation residue resulting from the distillation of tri-$n$-propyl aluminum from a reaction mixture resulting from the reaction of propylene and hydrogen with aluminum metal under Ziegler aluminum alkyl synthesis conditions. A still further preferred embodiment is the application of the above process to a distillation residue resulting from the distillation of triisobutyl aluminum from a reaction mixture resulting from the reaction of isobutylene and hydrogen with aluminum metal under Ziegler aluminum alkyl synthesis conditions. Still another preferred embodiment is the disposal of the distillation residue obtained in the manufacture of tri-$n$-butyl aluminum by reaction of butene-1 with aluminum under hydrogen pressure.

In a further preferred embodiment the composition is the distillation residue remaining after distilling an alkyl aluminum halide from a reaction mixture formed by reacting a lower alkyl halide (e.g., a $C_{1-4}$ alkyl chloride) with aluminum metal. The reaction of alkyl chlorides with aluminum metals forms alkyl aluminum sesquihalides (A. Von Grosse et al., J. Org. Chem. 5, p. 106, 1940; G. E. Coates, "Organo-Metallic Compounds," pp. 140–142, John Wiley and Sons, Inc., New York, 1960, incorporated herein by reference). The reaction is conducted at 50–200° C.

In a highly preferred embodiment the composition is the distillation residue remaining after distilling methyl aluminum sesquichloride from a reaction mixture formed by reacting methyl chloride with aluminum. In another highly preferred embodiment the composition is the distillation residue remaining after distilling ethyl aluminum sesquichloride from a reaction mixture formed by reacting ethyl chloride with aluminum.

The manner in which the present process is conducted is shown in the following examples.

EXAMPLE 1

In this example the process is applied to a distillation residue obtained by distilling triethyl aluminum from a reaction mixture obtained from the reaction of ethylene and hydrogen with aluminum metal under Ziegler conditions. This residue is referred to as "TEA heel." To 35 grams of TEA heel in an autoclave was added 349.2 grams of aniline. This gave a 7.5:1 mole ratio of aniline to aluminum. Upon addition of the heel to the aniline mild gas evolution was noted. The autoclave was then sealed and slowly heated to 264° C. (322 p.s.i.g.). After cooling to room temperature the autoclave was opened and discharged. The product was a black liquid containing solids. It was diluted with 280 grams of additional aniline and warmed to 50° C. To it was then added, while stirring, 107 ml. of 25 percent aqueous NaOH (1.6 moles NaOH per mole Al). An initial temperature rise of 22° C. was noted during the addition of the first 20 ml. The mixture was stirred 26 minutes at 50–60° C. and then allowed to settle. Two phases were formed. The upper aniline phase was clear and the lower caustic phase was black and highly viscous. Stirring was again started and continued for an hour. At the end of this time the mixture was again allowed to separate into an upper aniline phase and a lower brown opaque caustic phase. The two phases were separated. An additional 0.87 mole of caustic was added to the lower phase and sufficient water to produce 330 ml. of caustic phase. Then 57 grams of calcium hydroxide were added. The brown color disappeared and the solution turned white. After a period of heating and stirring the solution was allowed to settle. The solution clarified and a white chalky precipitate containing the aluminum values settled to the bottom.

EXAMPLE 2

In this example the process was applied to a distillation residue obtained by distilling triisobutyl aluminum from a reaction mixture obtained by reacting isobutylene and hydrogen with aluminum metal under Ziegler reaction conditions. This is referred to as "TIBA heel." To an autoclave was added 698.4 grams of aniline. To this was added 58 grams of TIBA heel. This gave a 7.5:1 mole ratio of aniline to aluminum. The autoclave was sealed and heated to 286° C. (1020 p.s.i.g.). The autoclave was then cooled to room temperature and discharged. The product was a black liquid containing solids. The reaction mixture was diluted with 220.2 grams of aniline and heated to 85° C., at which point most of the solids had dissolved. Then 537 ml. of 25 percent aqueous caustic (4 moles NaOH per mole Al) were then added to the reaction mixture while heating and stirring. An initial temperature rise of 60° C. was noted during the first 20 ml. of caustic addition. After stirring 41 minutes at 60–80° C. the mixture was allowed to settle, and two phases formed. The upper aniline phase was reddish-brown and the lower caustic phase black. The two phases were separated. Then 117 grams of calcium hydroxide (3 moles Ca(OH)$_2$ per 2 moles Al with a 15 percent excess) were then added to the caustic phase at 87° C. while stirring. The mixture turned gray. After heating and stirring for 30 minutes the mixture was allowed to settle. Gray chalk-like solids containing the aluminum values settled to the bottom, leaving a clear upper layer.

EXAMPLE 3

In an autoclave was placed 75 pounds of aniline and the vessel then purged with nitrogen. Following this, 7.2 pounds of distillation residue from a Ziegler type triethyl aluminum process (34.9 weight percent aluminum) was added to the aniline. This gave a mole ratio of aniline to aluminum of 7.5:1. The autoclave was sealed and heated. A reaction was noted at 160° C., causing the temperature to rise rapidly to 175° C. Autoclave pressure was limited to 600 p.s.i.g. by controlled venting. Heating was continued to 210° C. and the vessel was maintained at this temperature for an hour. It was then cooled to 70° C. and added to 110 pounds of 15 percent aqueous caustic. The mixture was stirred for 45 minutes and then allowed to separate into two phases. The upper wet aniline phase was recovered and distilled. The lower caustic phase was transferred to another vessel and 13.5 pounds of 25 percent aqueous lime slurry was added to it. The mixture was stirred and heated to 75° C. and held at this temperature for 45 minutes. It was then allowed to settle and the upper aqueous caustic phase removed. The remaining precipitate contained a substantial amount of calcium aluminate.

The foregoing examples illustrate how the present process can be used to recover aluminum from the distillation residue of a Ziegler type aluminum alkyl process. The manner in which the process can be applied to removal of aluminum from other alkyl aluminum containing products including pure aluminum alkyls will be apparent from these examples and the earlier discussion.

What is claimed is:

1. A method of recovering aluminum from a composition containing an alkyl aluminum compound, said method comprising reacting said composition with an aniline to form an aluminum anilide, hydrolyzing said aluminum anilide with aqueous base, and reacting the hydrolyzed product with an alkaline earth metal base to precipitate an alkaline earth metal aluminate in a recoverable form.

2. A method of Claim 1 wherein said composition is the distillation residue remaining after distilling an alkyl aluminum product from a reaction mixture formed by reacting a $C_{2-5}$ alpha-olefin and hydrogen with aluminum.

3. A method of Claim 2 wherein said aqueous base is aqueous sodium hydroxide.

4. A method of Claim 3 wherein said alkaline earth metal base is lime and said alkaline earth metal aluminate is calcium aluminate.

5. A method of Claim 4 wherein said alpha-olefin is ethylene and said alkyl aluminum product is triethyl aluminum.

6. A method of Claim 4 wherein said alpha-olefin is propylene and said alkyl aluminum product is tri-*n*-propyl aluminum.

7. A method of Claim 4 wherein said alpha-olefin is isobutene and said alkyl aluminum product is triisobutyl aluminum.

8. A method of Claim 4 wherein said alpha-olefin is butene-1 and said alkyl aluminum product is tri-*n*-butyl aluminum.

9. A method of Claim 4 wherein the aniline formed upon hydrolysis of said aluminum anilide is recovered.

10. A method of Claim 9 wherein the aqueous sodium hydroxide remaining after removal of said calcium aluminate is recovered and recycled as said aqueous base.

11. A method of Claim 1 wherein said composition is the distillation residue remaining after distilling an alkyl aluminum halide product from a reaction mixture formed by reacting a lower alkyl halide with aluminum.

12. A method of Claim 11 wherein said aqueous base is aqueous sodium hydroxide.

13. A method of Claim 12 wherein said alkaline earth metal base is lime and said alkaline earth metal aluminate is calcium aluminate.

14. A method of Claim 13 wherein said alkyl aluminum product is methyl aluminum sesquichloride and said lower alkyl halide is methyl chloride.

15. A method of Claim 13 wherein said alkyl aluminum product is ethyl aluminum sesquichloride and said alkyl halide is ethyl chloride.

16. A method of Claim 13 wherein the aniline formed upon hydrolysis of said aluminum anilide is recovered.

17. A method of Claim 16 wherein the aqueous sodium hydroxide remaining after removal of said calcium aluminate is recovered and recycled as said aqueous base.

References Cited

UNITED STATES PATENTS

| 3,554,695 | 1/1971 | Marshall et al. | 423—130 |
| 3,477,813 | 11/1969 | Fernald et al. | 423—119 |

OTHER REFERENCES

Chem. Abstr., 70, 81614y (1969).

"The Properties, Chemistry and Synthesis of Alkyl Aluminum," by L. F. Albright, Chem. Eng., 74 (25), 179–187 (1967).

JOHN H. MACK, Primary Examiner

A. WEISSTUCH, Assistant Examiner

U.S. Cl. X.R.

423—119, 122, 133, 158, 600